United States Patent
Rigon et al.

(10) Patent No.: US 11,076,662 B2
(45) Date of Patent: Aug. 3, 2021

(54) FUSED METEORITE

(71) Applicant: DAVID YURMAN IP LLC, New York, NY (US)

(72) Inventors: Matteo Rigon, Monticello Conte Otto VI (IT); David Yurman, New York, NY (US)

(73) Assignee: David Yurman IP LLC, New York, NY (US)

(*) Notice: Subject to any disclaimer, the term of this patent is extended or adjusted under 35 U.S.C. 154(b) by 260 days.

(21) Appl. No.: 16/079,416

(22) PCT Filed: Feb. 22, 2017

(86) PCT No.: PCT/US2017/018877
§ 371 (c)(1),
(2) Date: Aug. 23, 2018

(87) PCT Pub. No.: WO2017/147152
PCT Pub. Date: Aug. 31, 2017

(65) Prior Publication Data
US 2019/0008243 A1 Jan. 10, 2019

Related U.S. Application Data

(60) Provisional application No. 62/299,262, filed on Feb. 24, 2016.

(51) Int. Cl.
*A44C 17/00* (2006.01)
*A44C 27/00* (2006.01)
(Continued)

(52) U.S. Cl.
CPC .......... *A44C 17/007* (2013.01); *A44C 27/003* (2013.01); *B29C 39/003* (2013.01); *B29K 2505/14* (2013.01); *B29K 2705/00* (2013.01)

(58) Field of Classification Search
CPC ..... A44C 17/007; A44C 27/003; A44C 11/00; B29C 39/003; B29K 2505/14; B29K 2705/00
See application file for complete search history.

(56) References Cited

U.S. PATENT DOCUMENTS 6,652,004 B1 * 11/2003 Lam .................... A63H 3/36
206/457
2003/0142461 A1 7/2003 Decker et al.
(Continued)

FOREIGN PATENT DOCUMENTS

| CN | 102334786 B | 10/2013 |
|---|---|---|
| DE | 297 19 681 U1 | 1/1998 |
| TW | 200 700 032 A | 1/2007 |

OTHER PUBLICATIONS

D'Orazio et al., "Chemical Analysis or Iron Meteorites by Inductively Coupled Plasma-Mass Spectrometry," *Geostandards and Geoanalytical Research*, 27(3):215-225 (2003).
(Continued)

*Primary Examiner* — Nahida Sultana
(74) *Attorney, Agent, or Firm* — Arnold & Porter Kaye Scholer LLP

(57) ABSTRACT

The present disclosure describes a method for making fused meteorite, a method for bonding the fused meteorite to an article jewelry, and articles of jewelry comprising fused meteorite.

18 Claims, 1 Drawing Sheet

A.

B.

(51) Int. Cl.
*B29C 39/00* (2006.01)
*B29K 505/14* (2006.01)
*B29K 705/00* (2006.01)

(56) References Cited

U.S. PATENT DOCUMENTS

| | | | |
|---|---|---|---|
| 2007/0068196 A1 | 3/2007 | Seliktar | |
| 2013/0287622 A1* | 10/2013 | Hoffman | C22C 27/04 420/436 |
| 2014/0271556 A1* | 9/2014 | Stoppelbein | A61K 33/00 424/93.4 |
| 2014/0283472 A1 | 9/2014 | Moore et al. | |

OTHER PUBLICATIONS

Mirell, Contemporary Metal Jewelry by Edward Mirell, Website: https://web.archive.org/web/20151122044210/http://www.edwardmirell.com/about_contemporary_metals.php, Nov. 2015.
Yurman, David Yurman: The Meteorite Collection, Online Catalog (2015) <https://web.archive.org/web/20151212154940/http://www.davidyurman.com:80/products/men/collections/meteorite.html>.
Extended European Search Report dated Jul. 19, 2019, in European Patent Application No. 17757123.9.
International Search Report and Written Opinion dated May 3, 2017, in International Application No. PCT/US2007/018877.

* cited by examiner

A.
B.
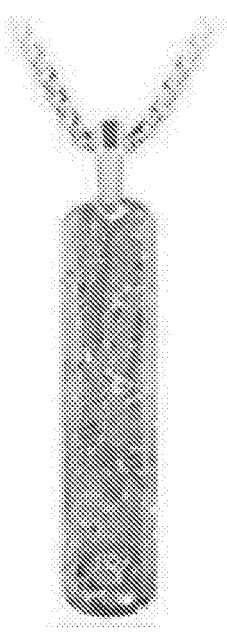
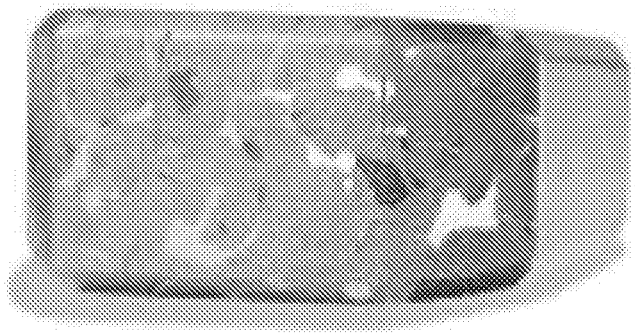

FUSED METEORITE

CROSS-REFERENCE TO RELATED APPLICATIONS

This application is a U.S. National Stage of International Application No. PCT/US2017/018877, filed Feb. 22, 2017, which claims the benefit of U.S. Provisional Application No. 62/299,262, filed Feb. 24, 2016, both of which are incorporated by reference in their entirety herein.

FIELD OF THE INVENTION

The present disclosure relates to articles of jewelry comprising fused meteorite and a method for making the fused meteorite.

BACKGROUND OF THE INVENTION

Meteorite is a remarkable stone featuring crystals of iron and nickel that provide its distinctive patterns. In rings, tags, cuff links, and bracelets, meteorite has an ancient quality that is completely contemporary.

Previous examples of jewelry comprising meteorite are known; however, the prior art does not describe jewelry comprising "fused meteorite" where a molten metal is combined with pieces of meteorite to produce a unique and stunning fused combination of metal and meteorite.

SUMMARY OF THE INVENTION

The present disclosure comprises a method for making fused meteorite, the method including placing pieces of meteorite in a mold, heating a metal having a melting temperature to a temperature at or above its melting temperature for a period of time sufficient to melt the metal, producing molten metal, pouring the molten metal into the mold comprising the pieces of meteorite to produce a raw fused material ("RFM"), cold pressing the RFM into a sheet having a thickness, heating the sheet of RFM to a temperature at or above the melting temperature of the metal for a period of time sufficient to melt the metal, but below the melting point of the pieces of meteorite, to produce fused meteorite, and cold pressing the fused meteorite.

An aspect of the present disclosure is a method for preparing an article of jewelry comprising fused meteorite, the method including obtaining a fused meteorite having a first metal, combining the fused meteorite with an article of jewelry having a housing adapted to seat the fused meteorite, the article of jewelry comprising a second metal; and heating the combination of the article of jewelry and the fused meteorite to a temperature sufficient to melt the first and the second metal. Preferably, the first and second metal are substantially the same, from the same source, or substantially identical. The first and second metal may be precious metal alloys.

The disclosure herein further describes and includes a method for preventing oxidation of fused meteorite comprising melting an anti-corrosive wax and applying the anti-corrosive wax to a piece of fused meteorite under a negative pressure (vacuum). The anti-corrosive wax may be transparent or semi-transparent. The anti-corrosive wax may be applied hot by dipping, brush, or airless spray equipment. The anti-corrosive wax may be a NO-OX-ID® White rust preventative wax from Sanchem, Inc. (Chicago, Ill.)

The disclosure herein further describes and includes an article of jewelry comprising fused meteorite prepared using any of the methods described herein. The article of jewelry may be one of any number of types of jewelry, including a ring, a toe ring, an earring, a tag, a bracelet, a cuff bracelet, an anklet, a cuff link, a watch, or a necklace.

BRIEF DESCRIPTION OF THE DRAWINGS

The present disclosure is disclosed with reference to the accompanying drawings, wherein:

FIG. 1A is a tag comprising fused meteorite prepared using the methods described herein; and FIG. 1B is a ring comprising fused meteorite prepared using the methods described herein.

DETAILED DESCRIPTION

The present invention relates to articles of jewelry comprising fused meteorite, methods for making fused meteorite, methods for incorporating fused meteorite into an article of jewelry, and methods for preventing corrosion of fused meteorite.

It should be particularly noted that the meteorite used in the present disclosure can be from any source depending on the desirability of particular physical characteristics. Without intending to be limiting, the desirability of particular physical characteristics may include, for example, mineral content, chemical composition, color, hardness, melting temperature, and crystal structure. In one embodiment, the meteorite may be Gibeon meteorite from Gibeon, Namibia. In another embodiment, the meteorite may be Muonionalusta meteorite from northern Scandinavia. Alternatively, the meteorite may be from the Sudbury basin located on the Canadian Shield in the city of Greater Sudbury, Ontario, Canada. In one embodiment, the meteorite may be from Vredefort Crater in South Africa or from Washington State's Eastern Goldfields. The meteorite may be composed mainly of iron. The meteorite may be structurally classified as a fine octahedrite. In one embodiment, the meteorite comprises at least 90% iron content. The meteorite may comprise at least 91%, at least 92%, at least 93%, at least 94%, or at least 95% iron content. The meteorite may be selected from the group consisting of iron meteorite, stony iron, achondrite, chondrite, and combinations thereof. The chondrite may be an enstatite chondrite (about 35% free Fe—Ni granules), a high iron chondrite (average about 19% Fe—Ni), a low iron chondrite (average about 9% Fe—Ni), or a low iron, low metal chondrite.

Definitions

The term "about" is understood to mean±10%. For example, the term "about 1 gram (g)" includes 0.9 g to 1.1 g.

As used herein, the term "cold press" or "cold pressing" is used as understood in the field of engineering. Therefore, "cold press" here is used synonymously with "stamping", in that the material is "pressed/stamped" (meaning external pressure is forcefully applied) at room temperature.

The term "RFM" (Raw Fused Material) refers to the combination of meteorite with a metal that has been melted prior to combining with the meteorite.

The term "room temperature" means that no heating or cooling is provided. In general, room temperature means an environment where the ambient temperature is between 16 degrees Celsius (° C.) and 25° C.

Steps to Prepare Fused Meteorite

Meteorite pieces may be broken down into small pieces suitable for use in jewelry. Meteorite may be ground into small pieces. The pieces of meteorite may be thin, irregular shapes. The meteorite may be waste meteorite. Each piece of meteorite may range in weight from 50 milligrams (mg) up to 10, 15, 20, 25, 50, 75, 100, 150, or 200 grams (g). In one embodiment, each piece of meteorite weighs less than 10 grams. Each piece of meteorite may weigh about 1 g, about 2 g, about 3 g, about 4 g, about 5 g, about 6 g, about 7 g, about 8 g, about 9 g, or about 10 g. In another embodiment, each pieces of meteorite weighs about 2 to 3 grams.

In yet another embodiment, each piece of meteorite ranges in size from 0.5 millimeters (mm) to 25 mm in length and width. Pieces of meteorite may about 3 mm in length and width. Each piece of meteorite has a length and width. The length of a piece of meteorite may be about 1 millimeter (mm), about 2 mm, about 3 mm, about 4 mm, about 5 mm, about 6 mm, about 7 mm, about 8 mm, about 9 mm, or about 10 mm. The width of a piece of meteorite may be about 1 millimeter (mm), about 2 mm, about 3 mm, about 4 mm, about 5 mm, about 6 mm, about 7 mm, about 8 mm, about 9 mm, or about 10 mm.

The small pieces of meteorite described above may be placed in a mold having a bottom surface. The bottom surface may be flat. The mold may be in the shape of a square or rectangle. Alternatively, the mold may be any shape suitable for the downstream application of the fused meteorite being produced. The pieces of meteorite may be randomly strewn across the bottom surface of the mold. Alternatively, the pieces of meteorite may be placed in a defined or ornamental pattern. The meteorite pieces may be at room temperature.

Separately, a metal may be heated to a temperature at or above the melting temperature of that metal so that the metal melts, resulting in molten metal. The metal may be any metal so long as it has a lower melting point than the meteorite to which it is combined. The metal may have a melting temperature that is at least 25° C., at least 50° C., at least 75° C., at least 100° C., at least 150° C., or at least 200° C. lower than the melting temperature of the meteorite.

The ratio of meteorite to metal may be about 1:1 weight to weight (w:w), about 1:2 (w:w), about 1:3 (w:w), about 1:4 (w:w), 1:5 (w:w), about 1:6 (w:w), about 1:7 (w:w), about 1:8 (w:w), 1:9 (w:w), about 1:10 (w:w), about 1:12 (w:w), about 1:15 (w:w), 1:20 (w:w), about 1:25 (w:w), or about 1:50 (w:w). The ratio of meteorite to metal may be about t 2:1 (w:w), about 3:1 (w:w), about 4:1 (w:w), about 5:1 (w:w), 6:1 (w:w), about 7:1 (w:w), about 8:1 (w:w), about 9:1 (w:w), 10:1 (w:w), about 12:1 (w:w), about 15:1 (w:w), about 20:1 (w:w), 25:2 (w:w), or about 50:1 (w:w).

The metal may be a precious metal. The metal may be a mixture of a precious metal and a non-precious metal. Without being limiting, the precious metal may be, for example, silver, gold, platinum, or palladium. The precious metal may be ruthenium, rhodium, osmium, or iridium, and platinum. In one embodiment, the metal may be any other form or combination of the aforementioned metals. In any event, the molten metal may be poured over the meteorite pieces that have been placed in a mold. The result is a fused combination of metal and meteorite defined herein as Raw Fused Material ("RFM"). The mold may be any shape including rectangular, or square shaped.

The metal may be an alloy. The alloy may be a gold alloy, a nickel alloy, a silver alloy, a platinum alloy, a titanium alloy, a bronze alloy, or a combination thereof. The alloy may comprise both gold and silver. It is contemplated herein that the alloy may include at least two, at least three, or at least four metals selected from the group consisting of gold, nickel, silver, platinum, pewter, and titanium. The silver may be sterling silver. Alternatively, the alloy may be bronze.

In one embodiment, the alloy is a gold alloy selected from the group consisting of yellow gold, colored gold, crown gold, electrum, rhodite (rhodium), rose gold, tumbaga, and white gold. The white gold alloy may comprise nickel and palladium.

In one embodiment, the alloy is a nickel alloy selected from the group consisting of alnico, alumel, chromel (chromium), cupronickel (bronze, copper), Ferronickel (iron), German silver (copper, zinc), hastelloy (molybdenum, chromium, sometimes tungsten), inconel (chromium, iron), monel metal (copper, iron, manganese), nichrome (chromium), nickel-carbon (carbon), nicrosil (chromium, silicon, magnesium), nisil (silicon), nitinol (titanium, shape memory alloy), magnetically: soft" alloys, mu-metal (iron), permalloy (iron, molybdenum), supermalloy (molybdenum), and brass (copper, zinc, manganese).

In one embodiment, the alloy is a silver alloy selected from the group consisting of argentium sterling silver (copper, germanium), billon, britannia silver (copper), doré bullion (gold), electrum (gold), goloid (copper, gold), platinum sterling (platinum), shibuichi (copper), sterling silver (copper), and tibetan silver (copper).

In one embodiment, the alloy is a titanium alloy selected from the group consisting of Beta C (vanadium, chromium), 6al-4v (aluminium, vanadium), titanium hydride (hydrogen), and titanium nitride (nitrogen).

Next, the RFM may be pressed into one or more sheets. Pressing the RFM into a sheet may be done using a hydraulic stamp machine. Pressing may be done using an industrial pressing mill. Pressing the RFM into a sheet may be done using any machine known in the art. This pressing may be done at room temperature (i.e. cold pressed). Alternatively, this pressing may be done at an elevated temperature such as at a temperature greater than 50° C., greater than 100° C., greater than 200° C., greater than 300° C., greater than 400° C., or greater than 500° C. The RFM may be allowed to cool to room temperature prior to cold pressing the RFM.

The pressed sheet of RFM may have a thickness of about 1 to 25 mm, about 1 to 20 mm, or about 5 to 15 mm. The thickness of the RFM may be about 5 mm, about 6 mm, or about 7 mm. A skilled artisan would understand that the preferred thickness of the sheet of RFM depends on the downstream application of the RFM. The thickness of the RFM may be 1 mm, 2 mm, 3 mm, 4 mm, 5 mm, 6 mm, 7, mm, 8 mm, 9 mm or 10 mm. The pressed sheet of RFM have a length and width. The length of the RFM may be about 1 centimeter (cm), about 2 cm, about 3 cm, about 4 cm, about 5 cm, about 6 cm, about 7 cm, about 8 cm, about 9 cm, about 10 cm, about 11 cm, about 12 cm, about 13 cm, about 14 cm, about 15 cm, about 16 cm, about 17 cm, about 18 cm, about 19 cm, or about 20 cm. The length may be greater than 20 cm. The width of the RFM may be about 1 centimeter (cm), about 2 cm, about 3 cm, about 4 cm, about 5 cm, about 6 cm, about 7 cm, about 8 cm, about 9 cm, about 10 cm, about 11 cm, about 12 cm, about 13 cm, about 14 cm, about 15 cm, about 16 cm, about 17 cm, about 18 cm, about 19 cm, or about 20 cm. The length and width may be substantially the same such that the sheet of RFM is square. Alternatively, the length and width may be different such that the sheet of RFM is rectangular.

Pressing the RFM into a sheet may leave voids or spaces between the metal and meteorite due to the lack of adhesion between the metal and meteorite. In order to fuse a metal (which has a lower melting point than meteorite) with meteorite, a pressed sheet of RFM may be heated. The pressed sheet of RFM may be heated in an oven. The pressed sheet of RFM may be heated to a temperature at or above the melting temperature of the metal. The pressed sheet of RFM may be heated for at least 10 minutes (min), at least 20 min, at least 30 min, at least 40 min, at least 50 min, at least 60 min, at least 90 min, or at least 120 min at a temperature at or above the melting temperature of the metal. The pressed sheet of RFM may be heated to a temperature of at least 500° C., at least 600° C., at least 700° C., at least 800° C., at least 900° C., at least 1000° C., at least 1100° C., at least 1200° C., at least 1300° C., at least 1400° C., at least 1500° C., at least 1600° C., at least 1700° C., at least 1800° C., at least 1900° C., or at least 2000° C. The pressed sheet of RFM may be heated to a temperature that at or above the melting temperature of the metal but still below the melting temperature of the meteorite. The pressed sheet of RFM may be heated to a temperature of less than 500° C., less than 600° C., less than 700° C., less than 800° C., less than 900° C., less than 1000° C., less than 1100° C., less than 1200° C., less than 1300° C., less than 1400° C., less than 1500° C., less than 1600° C., less than 1700° C., less than 1800° C., less than 1900° C., or less than 2000° C. In one embodiment, the pressed sheet of RFM may be heated in an oven for about 20 to 30 minutes at a temperature at or above the melting temperature of the metal but below the melting temperature of the meteorite. Heating a sheet of RFM at a temperature at or above the melting temperature of the metal causes at least some of the metal to melt to produce molten metal, and some of the molten metal is allowed to fill at least some of the voids or spaces between the metal and meteorite and fusing the metal with the meteorite leaving "fused meteorite."

After heating a sheet of RFM at the chosen temperature for the chosen time period to produce fused meteorite, the fused meteorite may be allowed to cool to room temperature. The cooled fused meteorite may be pressed for a second time. The second pressing (pressing the fused meteorite) may be done at room temperature. Pressing the fused meteorite may be done using a hydraulic stamp machine. Pressing the fused meteorite may be done using an industrial pressing mill. Pressing the fused meteorite may be done using any machine known in the art. A randomized pattern may be created as a result of the manner in which the molten metal has flowed into the voids or spaces between the metal and meteorite during the RFM heating process. The second pressing (pressing the fused meteorite) may be done at a temperature greater than 50° C., greater than 100° C., greater than 200° C., greater than 300° C., greater than 400° C., greater than 500° C., or greater than 1000° C. The method may further comprise allowing the fused meteorite to cool to room temperature prior to cold pressing the fused meteorite.

After the pressing of the fused meteorite, the resulting fused meteorite may be uneven at the surface and may contain protrusions. The method may include smoothing out the surface of the fused meteorite. A Computerized Numerical Control milling machine ("CNC Mill") may be used to smooth out the uneven surface so that the resulting sheets of fused meteorite are smooth and flat at the surface.

The method described herein may further include milling the fused meteorite into a pre-shaped silhouette. The pre-shaped silhouette may a sphere, an oval, rectangular, square, irregular shaped, gemstone shaped, tear-drop shaped, oblong, a substantial circular band or part thereof, heart-shaped, or any other desired shape. The pre-shaped silhouette may be any shape, size, or thickness suitable for its destined downstream application. The milling may done with a CNC Mill. The milling may done by hand. The milling may be done by any process known in the art suitable for preparing ornamental shapes of fused meteorite from a sheet of fused meteorite.

Steps to Bind Fused Meteorite to Jewelry

The method described herein may further include binding a pre-shaped silhouette of fused meteorite to an article of jewelry. In particular, the article of jewelry may be a ring, an earring, a toe ring, a tag, a bracelet, a cuff bracelet, an anklet, a cuff link, a watch, or a necklace. The article of jewelry may have a housing to hold the fused meteorite. The heating of the housing and the pre-shaped silhouette may not melt the meteorite. The article of jewelry may have a housing comprising a metal. The metal of the housing may be a precious metal. The metal of the housing may be a mixture of a precious metal and a non-precious metal. The precious metal may selected from the group consisting of silver, gold, palladium, titanium, and platinum. The metal of the housing may be an alloy. The metal of the housing and the metal of the fused meteorite may be substantially the same composition. The metal base of the housing and the metal of the fused meteorite may be from the same source. The metal base of the housing and the metal of the fused meteorite may have an identical composition. The binding may include seating the pre-shaped silhouette in the housing of the article of jewelry and heating the housing and the pre-shaped silhouette to a temperature sufficient to at least partially melt the metal of the housing and the metal of the fused meteorite. Heating the housing may include heating all or part of the article of jewelry. The article of jewelry may be any type of jewelry. The fused meteorite may be fused to the article of jewelry by heating to a temperature at or above the melting temperature of the metal which is lower than that of meteorite so the meteorite is substantially unaffected. Alternatively, the heating may not melt more than 5%, 10%, 15%, 20%, or 25% of the meteorite.

Heating the housing (article of jewelry) and the pre-shaped silhouette of fused meteorite may include heating to a temperature of at least 500° C., at least 600° C., at least 700° C., at least 800° C., at least 900° C., at least 1000° C., at least 1100° C., at least 1200° C., at least 1300° C., at least 1400° C., at least 1500° C., at least 1600° C., at least 1700° C., at least 1800° C., at least 1900° C., or at least 2000° C. Heating the housing (article of jewelry) and the pre-shaped silhouette of fused meteorite may include heating to a temperature of less than 500° C., less than 600° C., less than 700° C., less than 800° C., less than 900° C., less than 1000° C., less than 1100° C., less than 1200° C., less than 1300° C., less than 1400° C., less than 1500° C., less than 1600° C., less than 1700° C., less than 1800° C., less than 1900° C., or less than 2000° C. Heating may be maintained at a temperature at or above the melting temperature of the metal for at least 15 min, at least 30 min, at least 45 min, at least 60 min, at least 75 min, at least 90 min, or at least 120 or more min.

The method described herein may further include polishing the article of jewelry with the fused meteorite. The method described herein may further include cleaning the article of jewelry with the fused meteorite.

Rust Prevention

The method described herein may further include applying an anti-corrosive material to the fused meteorite. The anti-corrosive material may be an anti-corrosive wax. Applying the anti-corrosive wax may include melting the wax and using a negative pressure such as a vacuum to help the wax penetrate any voids in the fused meteorite. The anti-corrosive wax may be transparent or semi-transparent. The anti-corrosive wax may be applied hot by dipping, brush, or airless spray equipment. The anti-corrosive wax may be NO-OX-ID® XXX White rust preventative wax from Sanchem, Inc. (Chicago, Ill.).

Exemplary Embodiments

In one aspect, the meteorite has a first melting temperature, the metal has a second melting temperature, and the first melting temperature is higher than the second melting temperature. The first melting temperature may at least 50° C. higher than the second melting temperature.

In one aspect, the meteorite is broken down into pieces of a size suitable for use in jewelry making prior to the combining pieces of the meteorite with the metal. The meteorite may be selected from the group consisting of iron meteorite, stony iron, achondrite, chondrite, and combinations thereof. The chondrite may be an enstatite chondrite (about 35% free Fe—Ni granules), a high iron chondrite (average about 19% Fe—Ni), a low iron chondrite (average about 9% Fe—Ni), or a low iron, low metal chondrite. The pieces of meteorite may be thin, irregular shapes. The pieces of meteorite may range in weight from 50 milligrams (mg) up to 10, 15, 20, 25, 50, 75, 100, 150, or 200 grams (g). The pieces of meteorite may weigh less than 10 grams each, may weigh about 2 to 3 grams each, may range in size from 0.5 millimeters (mm) to 25 mm in length and width, and/or may be about 3 mm in length and width.

In one aspect, the metal may be a precious metal, or a mixture of a precious metal and a non-precious metal.

In one aspect, the stamping may be done using an industrial pressing mill.

In one aspect, the cold pressing of the RFM is done at room temperature. In another aspect, the cold pressing of the RFM is done at a temperature greater than 100° C., greater than 500° C., or greater than 1000° C. The cold pressing of the fused meteorite may also be done at room temperature. Alternatively, the cold pressing of the fused meteorite may be done at a temperature greater than 100° C., greater than 500° C., or greater than 1000° C.

In one aspect, the method described herein further comprises binding a pre-shaped silhouette of fused meteorite to an article of jewelry, the article of jewelry having a housing comprising a metal, wherein the binding comprises seating the pre-shaped silhouette in the housing and heating the housing and pre-shaped silhouette to a temperature sufficient to at least partially melt the metal of the housing and the metal of the fused meteorite. The article of jewelry may be a ring, an earring, a toe ring, a tag, a bracelet, a cuff bracelet, an anklet, a cuff link, a watch, or a necklace. The metal of the housing and the metal of the fused meteorite may be substantially the same composition, from the same source, and/or identical. The heating may not melt more than 5%, 10%, 15%, 20%, or 25% of the meteorite. The metal of the housing may be a precious metal, or a mixture comprising a precious metal and a non-precious metal. The precious metal may be selected from the group consisting of silver, gold, palladium, and platinum.

In one aspect, the method further comprises polishing and cleaning the article of jewelry and the fused meteorite, and/or applying an anti-corrosive wax to the fused meteorite. Applying the anti-corrosive wax may comprise melting the wax and using a negative pressure such as a vacuum to help the wax penetrate any voids in the fused meteorite. The anti-corrosive wax may be NO-OX-ID® XXX White Rust Preventative Wax.

In one aspect, metal may be an alloy, such as a gold alloy, a nickel alloy, a silver alloy, a platinum alloy, a titanium alloy, a bronze alloy, or a combination thereof. The alloy may be bronze or a white gold comprising nickel and palladium.

The disclosure herein may further include a method for preparing an article of jewelry comprising fused meteorite, the method comprising obtaining a fused meteorite having a first metal; combining the fused meteorite with an article of jewelry having a housing adapted to seat the fused meteorite, the article of jewelry comprising a second metal; and heating the combination of the article of jewelry and fused meteorite to a temperature sufficient to melt the first and second metal. The first metal and the second metal may be substantially the same. The first metal and the second metal may be a precious metal. The precious metal may be selected from the group consisting of silver, gold, palladium, and platinum. The heating may comprise heating to a temperature of at least 500° C., at least 600° C., at least 700° C., at least 800° C., at least 900° C., at least 1000° C., at least 1100° C., at least 1200° C., at least 1300° C., at least 1400° C., at least 1500° C., at least 1600° C., at least 1700° C., at least 1800° C., at least 1900° C., or at least 2000° C. The heating may comprise maintaining a temperature at or above the melting temperature of the first metal for at least 15, 30, 45, 60, 75, 90, 120 or more minutes. The method may further comprise polishing and cleaning the article of jewelry and the fused meteorite. The method may further comprise applying an anti-corrosive wax to the fused meteorite. The article of jewelry may be a ring, an earring, a toe ring, a tag, a bracelet, a cuff bracelet, an anklet, a cuff link, a watch, or a necklace.

A method for preventing oxidation of fused meteorite comprising melting and anti-corrosive wax and applying the anti-corrosive wax to a piece of fused meteorite under a negative pressure (vacuum).

Articles of Jewelry

The disclosure herein further include an article of jewelry comprising fused meteorite prepared using any of the methods described above. The article of jewelry may be a ring, a toe ring, an earring, a tag, a bracelet, a cuff bracelet, an anklet, a cuff link, a watch, or a necklace. The ring may a band or signet ring. The fused meteorite may include pieces of meteorite and a metal. The metal may be a precious metal, a non-precious metal, or a combination thereof. The metal may be an alloy. The alloy may be a gold alloy, a nickel alloy, a silver alloy, a platinum alloy, a titanium alloy, a bronze alloy, or a combination thereof. The alloy may include at least two, at least three, or at least four metals selected from the group consisting of gold, nickel, silver, platinum, and titanium. The alloy may be bronze. The pieces of meteorite may be irregular shapes. The meteorite may be waste meteorite. The precious metal may surround the irregular shapes and fill voids in the meteorite.

The article of jewelry described herein may include a precious metal selected from the group consisting of gold, nickel, silver, platinum, titanium, and combinations thereof. The titanium may be black titanium. The fused meteorite may comprise white gold or yellow gold. The white gold or the yellow gold may be 9 karat, 14 karat, 18 karat, 22 karat, or 24 karat gold. The fused meteorite may comprise sterling silver. The sterling silver may be stippled sterling silver.

The article of jewelry described herein may include a housing to hold or support the fused meteorite. The article of jewelry described herein may include a fused meteorite inlay.

The article of jewelry described herein may include a fused meteorite inlay, where the precious metal is sterling silver.

The article of jewelry described herein may include a ring comprising a fused meteorite inlay, where the precious metal is 14 or 18 karat white or yellow gold.

The article of jewelry described herein may include a fused meteorite inlay, where the precious metal is black titanium.

While the present disclosure has been described with reference to particular embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the scope of the present disclosure.

Therefore, it is intended that the present disclosure not be limited to the particular embodiments disclosed as the best mode contemplated for carrying out the present disclosure, but that the present disclosure will include all embodiments falling within the scope and spirit of the appended claims.

EXAMPLES

Example 1

The fused meteorite compound is bonded to and inlaid into a piece of precious metal jewelry design (e.g., band of a ring, frame, and back of a dogtag). The metal composition used for the surrounding jewelry design is the same metal composition that is fused with the meteorite in the preparation of the fused meteorite. In this example, we use silver, which has a melting point of 961.8° C., so a sheet of fused meteorite is heated in an oven to a temperature of at least 961.8° C. This process allows the metal to flow freely around the meteorite in a molten liquid state bonding the two materials together. Because the melting point of the precious metals (including silver) are lower than that of meteorite, the meteorite is unaffected in this heating process. For example, if the fused meteorite sheet is being used to make a dogtag, the pre-shaped silhouette will have the same dimensions as the finished dogtag design (not including the precious metal base that forms the jewelry pieces and houses the fused meteorite). If the fused meteorite is applied to a ring, then the pre-shaped silhouette is the same dimension as the circumference of the ring so that it can later be incorporated when fused to the precious metal base housing.

Example 2

An anti-corrosive wax is melted and vacuumed into the irregular surfaces of the fused meteorite which helps prevent the rapid oxidation and rusting of the fused meteorite. Rapid oxidization may occur due to the high iron content of meteorite material. Without this final step, the jewelry created using fused meteorite may quickly oxidize and rust, which is highly undesirable, particularly with jewelry designs and precious metal jewelry designs.

The invention claimed is:

1. A method for making fused meteorite comprising:
   placing pieces of meteorite in a mold, said mold having a flat bottom surface;
   heating a metal having a melting temperature to a temperature at or above said melting temperature for a period of time sufficient to melt said metal producing molten metal;
   pouring said molten metal into said mold comprising said pieces of meteorite to produce a raw fused material ("RFM"), wherein said RFM is a combination of said metal and said pieces of meteorite;
   cold pressing said RFM into a sheet having a thickness;
   heating said sheet to a temperature at or above said melting temperature for a period of time sufficient to melt said metal, but below the melting point of said pieces of meteorite, to produce fused meteorite; and
   cold pressing said fused meteorite.

2. The method of claim 1, further comprising smoothing out the surface of said fused meteorite.

3. The method of claim 1, wherein said pieces of meteorite is Gibeon meteorite or Muonionalusta meteorite.

4. The method of claim 1, wherein said pieces of meteorite are classified as a fine octahedrite.

5. The method of claim 1, wherein said pieces of meteorite comprise at least 90% iron content.

6. The method of claim 1, wherein said placing comprises placing said pieces of meteorite randomly in said mold.

7. The method of claim 1, wherein said fused meteorite is suitable for use in an article of jewelry.

8. A method for preparing an article of jewelry comprising fused meteorite, said method comprising obtaining a fused meteorite having pieces of meteorite embedded in a first metal;
   combining said fused meteorite with an article of jewelry having a housing adapted to seat said fused meteorite, said article of jewelry comprising a second metal; and
   heating the combination of said article of jewelry and said fused meteorite to a temperature sufficient to melt said first and said second metal.

9. The method of claim 8, further comprising applying an anti-corrosive wax to said fused meteorite.

10. The method of claim 9, wherein said applying an anti-corrosive wax comprises melting said wax and using a negative pressure to help said wax penetrate any voids in said fused meteorite.

11. The method of claim 8, wherein said article of jewelry is a ring, a toe ring, an earring, a tag, a bracelet, a cuff bracelet, an anklet, a cuff link, a watch, or a necklace.

12. The method of claim 8, wherein said first metal is a precious metal, a non-precious metal, or a combination thereof.

13. The method of claim 8, wherein said first metal is an alloy.

14. The method of claim 13, wherein said alloy is bronze, a gold alloy, a nickel alloy, a silver alloy, a platinum alloy, a titanium alloy, a bronze alloy, or a combination thereof.

15. The method claim 8, wherein said fused meteorite comprises pieces of meteorite having irregular shapes.

16. The method of claim 14, wherein said titanium alloy is black titanium.

17. The method of claim 14, wherein said gold alloy is 9 karat, 14 karat, 18 karat, 22 karat, or 24 karat gold.

18. The method of claim 9, wherein said temperature is below the melting point of all pieces of meteorite in said fused meteorite.

* * * * *